(12) United States Patent
Lee et al.

(10) Patent No.: US 7,976,620 B2
(45) Date of Patent: Jul. 12, 2011

(54) METHODS FOR HYDROGEN STORAGE AND REFRIGERATION

(75) Inventors: Ron Lee, Bloomsbury, NJ (US); Frank R. Fitch, Bedminster, NJ (US); Satish S. Tamhankar, Scotch Plains, NJ (US)

(73) Assignee: Linde North America, Inc., Murray Hill, NJ (US)

( * ) Notice: Subject to any disclaimer, the term of this patent is extended or adjusted under 35 U.S.C. 154(b) by 247 days.

(21) Appl. No.: 12/297,259

(22) PCT Filed: May 2, 2007

(86) PCT No.: PCT/US2007/010542
§ 371 (c)(1),
(2), (4) Date: Feb. 2, 2009

(87) PCT Pub. No.: WO2007/130405
PCT Pub. Date: Nov. 15, 2007

(65) Prior Publication Data
US 2009/0185972 A1    Jul. 23, 2009

Related U.S. Application Data

(60) Provisional application No. 60/798,804, filed on May 4, 2006.

(51) Int. Cl.
*F17C 11/00* (2006.01)
(52) U.S. Cl. ............................ 96/146; 206/0.7; 502/526

(58) Field of Classification Search ...... 95/90, 114–116; 96/108, 143, 146; 206/0.7; 502/526; 423/248, 423/648.1, 658.2
See application file for complete search history.

(56) References Cited

U.S. PATENT DOCUMENTS

| 4,173,620 | A  | * | 11/1979 | Shimizu ...................... 423/648.1 |
| 4,343,770 | A  | * | 8/1982  | Simons ......................... 422/112 |
| 4,444,727 | A  | * | 4/1984  | Yanagihara et al. ........... 422/223 |
| 4,609,038 | A  | * | 9/1986  | Ishikawa et al. .......... 165/104.12 |
| 5,080,875 | A  | * | 1/1992  | Bernauer ....................... 423/210 |
| 5,339,649 | A  |   | 8/1994  | Kawai et al. |
| 6,134,916 | A  |   | 10/2000 | Jahnke |
| 7,241,331 | B2 | * | 7/2007  | Wu et al. ........................... 96/134 |
| 2003/0209149 | A1 | * | 11/2003 | Myasnikov et al. ............. 96/146 |
| 2005/0051294 | A1 | * | 3/2005  | Fujita et al. ...................... 165/10 |
| 2005/0145378 | A1 | * | 7/2005  | Mori et al. ...................... 165/157 |

OTHER PUBLICATIONS

A.G. Wong-Foy, A.J. Matzger and O.M. Yaghi, "Exceptional H2 Saturation Uptake in Microporous Metal-Organic Frameworks," J. Am. Chem. Soc. 128, pp. 3494-3495 (2006).

* cited by examiner

*Primary Examiner* — Frank M Lawrence
(74) *Attorney, Agent, or Firm* — Philip H. Von Neida

(57) ABSTRACT

A hydrogen storage system for storing hydrogen gas at elevated pressures and cryogenic temperatures is disclosed. The hydrogen gas is fed to a storage container which contains a physisorption type material and a volatile liquid container for liquid nitrogen. Cryogenic conditions are maintained within the storage container during the periods of storage and the periods where the hydrogen gas is removed from the storage system.

30 Claims, 2 Drawing Sheets

METHODS FOR HYDROGEN STORAGE AND REFRIGERATION

CROSS REFERENCE TO RELATED APPLICATIONS

This application claims priority from International Application Serial No. PCT/US2007/010542, filed 2 May 2007 (published as WO 2007/130405 A2, with publication date 15 Nov. 2007), which claims priority from U.S. application No. 60/798,804 filed 4 May 2006.

BACKGROUND OF THE INVENTION

The expansion of the use of hydrogen in industrial and commercial areas has caused a greater need to store hydrogen effectively. This is particularly true as hydrogen becomes a fuel of choice for fleet and automotive applications where hydrogen must be stored on-board the vehicle itself and be readily available from a fuelling station.

Currently the most prevalent methods of storage and transportation consist of liquid hydrogen or compressed hydrogen gas at 200 to 800 bar pressure. While liquid hydrogen provides the highest possible density, it is expensive to produce as this requires temperatures as low as 20 K, which uses about 47 MJ/kg $H_2$. Conventional 200 bar pressure compressed gas has a relatively low density. A pressure of about 800 bar at 300 K is required to obtain a storage capacity 70% of that of liquid $H_2$. As a compromise, hydrogen can be stored at a moderate pressure of 80 to 100 bar at a cryogenic temperature, such as at 77 K, using liquid nitrogen as the coolant. However, this generally would require continuous refrigeration, and would likely consume significant quantities of liquid nitrogen.

It is also known to use a physisorption type adsorbent at a cryogenic temperature, such as 77 K, to provide higher storage capacity at moderate pressures. The inventive method further uses the refrigeration provided by hydrogen desorption due to its withdrawal and usage to maintain the cryogenic temperature. As a result only a small amount of liquid nitrogen is necessary. The overall energy of refrigeration and compression required to produce the storage conditions according to the invention is about 17 MJ/kg of hydrogen at 80 to 100 bar. This is significantly lower than the energy required to produce liquid hydrogen which is about 47 MJ/kg and is somewhat less than the energy required to store hydrogen at comparable densities without adsorbent material at 200 bar and 77 K.

The present invention provides for means to store hydrogen at useful densities of about 30 to 50 kg/m$^3$ in a cost effective manner. The method of storage of the present invention will passively provide refrigeration and increase storage times compared to comparable cryogenic storage options.

SUMMARY OF THE INVENTION

The present invention provides for methods for storing hydrogen. The storage vessel is generally an on-board storage container, remote storage tank or a bulk transport container. Long term storage of hydrogen under conditions of random or infrequent usage is achieved by employing a small amount of liquid nitrogen which is guard cooled by the refrigeration effect of desorption. Physisorption material at about 77 K will provide high adsorption capacity and a refrigeration effect during desorption.

In one embodiment of the present invention, there is disclosed a method for storing hydrogen gas comprising a storage vessel containing a physisorption type adsorbent material and a volatile liquid container, wherein the volatile liquid container is in intimate heat transfer relationship with the hydrogen gas and the adsorbent material, and periodically removing at least a portion of the hydrogen gas.

In another embodiment of the present invention, there is disclosed an apparatus for the storage of hydrogen gas comprising a storage vessel, physisorption type adsorbent contained within the storage vessel, volatile liquid container contained within the storage vessel, at least one means for inputting the hydrogen gas and at least one means for inputting the volatile liquid.

In a further embodiment of the present invention, there is disclosed a method for storing hydrogen gas at elevated pressures and cryogenic temperatures comprising a storage vessel that contains a physisorption type adsorbent material and a volatile liquid container and at least periodically removing the hydrogen gas wherein the hydrogen gas is maintained at cryogenic temperatures during storage.

Optionally other volatile refrigerants (e.g., hydrocarbons, LNG, liquid air, etc.) can be used instead of liquid nitrogen and the volatile liquid container may be operated at different pressures. For the purpose of this disclosure, liquid air is defined as an arbitrary mixture of oxygen and nitrogen. Furthermore, other refrigerants can be used, such as materials that undergo phase change from liquid to vapor, from solid to liquid and from solid to vapor. In general, with alternative refrigerants, the operating temperature range can be from about 30 to 250 K, but more usefully from about 50 to 150 K. The optimum operating temperature will generally depend on the specific adsorbent material and optimization and development of those materials.

Examples of such physisorption type materials include high surface area carbons, for example KOH or thermally activated carbons, alkali metal intercalated, exfoliated, nanostack or herringbone graphitic carbons, carbon nanoforms such as nano-tubes, nano-horns, nano-onions, Buckminster Fullerenes "buckyballs" and their metal decorated or heterosubstituted analogues; crystalline microporous materials such as zeolites, clays and ALPO-4's and their heteroatom substituted analogues; mesoporous silicas, such as the MCM families and their heteroatom analogues; high surface area metallo-organic or organic framework materials; and other crystalline, for example, certain hexacyanoferrate materials, and non-crystalline high surface area materials as well as mixtures of these materials. Preferred materials include: high surface area carbons such as AX-21™ provided by Anderson Development Corporation and MAXSORB provided by Kansai Coke Corporation; and metalorganic frameworks such as MOF-177, IRMOF-1 (MOF-5) and IRMOF-20 developed by Prof. Omar Yaghi of the University of Michigan.

DETAILED DESCRIPTION OF THE INVENTION

Figure 1:
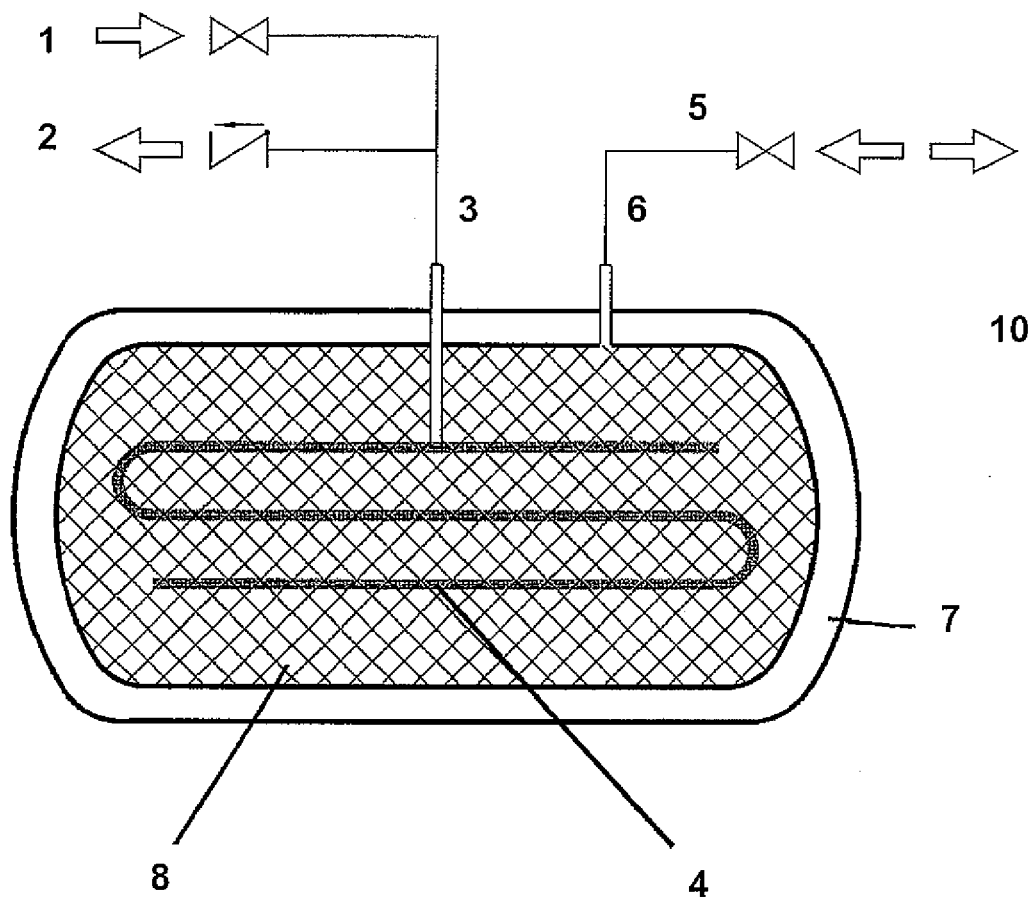
FIG. 1 is a schematic representation of a hydrogen storage system according to the methods of the present invention.

FIG. 1 shows a schematic of an embodiment according to the present invention. The schematic shows a cryogenic storage vessel 10 containing a physisorption type material 8 appropriate for the adsorption of hydrogen at about 77 K. The cryogenic storage vessel 10 will have a layer of insulation 7 surrounding the adsorbent material 8.

A broad range of adsorbent materials may be employed, including physisorbent materials that include high surface area carbons, for example KOH or thermally activated carbons, alkali metal intercalated, exfoliated, nanostack or herringbone graphitic carbons, carbon nanoforms such as nanotubes, nano-horns, nano-onions, Buckminster Fullerenes "buckyballs" and their metal decorated or heterosubstituted analogues; crystalline microporous materials such as zeolites, clays and ALPO-4's and their heteroatom substituted analogues; mesoporous silicas, such as the MCM families and their heteroatom analogues; high surface area metallo-organic or organic framework materials; and other crystalline, for example, certain hexacyanoferrate materials, and non-crystalline high surface area materials. Preferred materials include: high surface area carbons such as AX-21™ provided by Anderson Development Corporation and MAX-SORB provided by Kansai Coke Corporation; and metalorganic frameworks such as MOF-177, IRMOF-1 (MOF-5) and IRMOF-20 developed by Prof. Omar Yaghi of the University of Michigan. In addition, combinations of adsorbent materials may be advantageously employed to optimize the storage capacity and refrigeration effect of desorption. This combination may include both physisorbent materials, as well as other adsorbent materials such at metal hydrides, and even non-adsorbent heat transfer materials such as metals or graphite.

The amount (or volume) of physisorbent material enclosed in the storage vessel is generally the maximum achievable. The amount of space not occupied by the adsorbent material will generally include interstitial space that will exist if the adsorbent material is in a pellet or bead form. For pellets or beads, the interstitial space is about 33% of the available volume. Alternatively, the adsorbent material can be manufactured to fully occupy the space (e.g., a monolith type construction) where the interstitial space will be much less. According to this invention, the relative amounts of hydrogen adsorbed on the said physisorbent material and that present in the interstitial spaces are optimized to maximize the storage capacity of the system while providing adequate refrigeration and minimizing overall system cost.

For purposes of illustration, Metal-Organic Frameworks (MOFs) of the type discussed in A. G. Wong-Foy, A. J. Matzger, and O. M. Yaghi, "Exceptional $H_2$ Saturation Uptake in Microporous Metal-Organic Frameworks," J. Am. Chem. Soc. 128, pp. 3494-3495 (2006) were considered. The adsorption characteristics of physisorption materials appropriate for hydrogen storage are indicated by the performance of MOF-177. At about 80 bar and 77 K, MOF-177 will adsorb about 32 Kg/m$^3$. When the gas stored in crystalline interstitial space is considered, the storage capacity increases to about 49 Kg/m$^3$ of hydrogen. If there is further storage system voidage due to the packing characteristics of the adsorbent material, the effective storage capacity will drop further to about 43 Kg/m$^3$ for a 33% packing voidage. The adsorption/desorption characteristics of physisorption type materials generally ensure the hydrogen can be desorbed with only a drop in pressure and an associated modest drop in temperature. The drop in temperature is a direct result of the refrigeration produced by the heat of desorption.

In practice, the hydrogen will generally need to be supplied to the storage container as a refrigerated gas through lines 5 and 6 at the appropriate pressure and at about 77 K. The storage pressure is in the range 10 to 500 bar, and preferably in the range 50 to 150 bar. The target storage temperature is in the range 70 to 120 K, and preferably in the range 77 to 90 K when liquid nitrogen or liquid air is used as the refrigerant. This filling process will generally occur at a central filling station provisioned with a bulk liquid nitrogen tank and appropriate heat exchangers and other equipment necessary for supplying the refrigerated hydrogen gas and liquid nitrogen for the other refrigeration requirements during filling. During filling, the hydrogen gas that is adsorbed will release thermal energy (heat of adsorption) at a rate of about 4 to 7 KJ/gmole. This modest heating effect will need to be matched by provision of additional refrigeration, which is most easily provided by liquid nitrogen at the filling station. Liquid nitrogen is provided to the volatile liquid container (which can be in a variety of shapes and sizes, including for example heat transfer coils and related surfaces) during the hydrogen filling process to both fill the container with liquid nitrogen, as well as to provide refrigeration during the filling process associated with ambient heat load and the heat of adsorption. The additional refrigeration provided to offset the heat of adsorption will be returned to the system during hydrogen gas removal via the equal and opposite heat of desorption. It is this refrigeration effect that will guard cool the liquid nitrogen inside the volatile liquid container during normal operation, and offset the ambient heat load that occurs continuously.

Once filled, the hydrogen storage system will be subject to ambient heat load that is a function of the ambient temperature, type of insulation, and size of container. The preferred type of insulation is vacuum insulation with layers of reflective material filling the vacuum space. For example, a typical 160 liter liquid nitrogen storage vessel (dewar) sees an ambient heat load of about 4 to 5 watts. The purpose of the liquid nitrogen in the volatile liquid container shown in FIG. 1 becomes apparent when it is noted that the pressure inside the storage vessel will rise dramatically if the ambient heat load causes an internal temperature rise. This is a combination of both normal warming and expansion of the free hydrogen gas, as well as desorption of hydrogen from the adsorbent material. With a proper internal arrangement of the volatile liquid container that ensures good thermal connection with the contents of the storage vessel, the liquid nitrogen will prevent the storage vessel temperature from rising appreciably above 77 K. For a normal, 77 K, hydrogen gas storage vessel (i.e., without adsorbent material), the amount of liquid nitrogen required would be unacceptably large even for storage periods as short as a week.

The volatile liquid container 4 is filled through line 3 via line 1. The volatile liquid container 4 can also be vented based on the operating conditions through lines 3 and 2. A pressure relief valve, not shown, can also be employed either in place of or in series with the check valve on line 2 to periodically vent some nitrogen as necessary to maintain a desired elevated liquid nitrogen pressure. This venting is normally performed automatically to maintain the desired liquid nitrogen operating pressure and temperature. This venting will occur whenever the liquid is required to boil to maintain system temperature.

The method of the present invention exploits the refrigeration effect caused by hydrogen desorption, which reduces the amount of liquid nitrogen required to an acceptably small amount. The present invention envisions storage tank systems where there is at least periodic hydrogen usage. During periods of hydrogen usage, the arrangement shown in FIG. 1 ensures that the liquid nitrogen will see essentially no heat load (i.e., it is guard cooled) due to the refrigeration effect caused by the heat of desorption. This will generally be true for usage rates that cause an amount of refrigeration equal to the amount of ambient heat load on average. For the example 160 liter dewar, this corresponds to average usage equivalent to emptying the storage vessel within 1 to 4 weeks (depending on the exact heat of desorption). For larger systems, the characteristic time period will increase as the relative amount of ambient heat load decreases on a per unit volume basis. Conversely, the characteristic time period will decrease for smaller systems.

During periods of hydrogen usage, the refrigeration effect of desorption could also be used to liquefy gases such as ambient air or nitrogen. The gases to be liquefied would generally need to be dry. Such an arrangement could maintain the temperature of the storage system more uniformly and provide a means to passively fill or replenish the liquid nitrogen (or other volatile liquid stored in the volatile liquid container. The refrigeration effect of desorption can be used to condense other gases.

The pressure in the volatile liquid container can be maintained at any arbitrary value through the use of a pressure relief valve or other arrangement in place of or in addition to the check valve. The check valve can also be replaced by any number of alternative piping arrangements. The range of target operating temperatures and pressures for the liquid nitrogen is 70 to 120 K and −0.6 to 24.1 bar, and preferably 77 to 90 K and 0 to 2.6 bar.

The cryogenic storage conditions of the hydrogen may be at temperatures considerably removed from 77 K, either by using alternative volatile refrigerants (e.g., hydrocarbons, LNG, liquid air, etc.) or operating the volatile liquid container at arbitrary pressures. In general, with alternative volatile refrigerants, the operating temperature range can be from about 30 to 250 K, but more usefully from about 50 to 150 K. The optimum operating temperature will generally depend on the specific adsorbent material and optimization and development of those materials.

Figure 2:
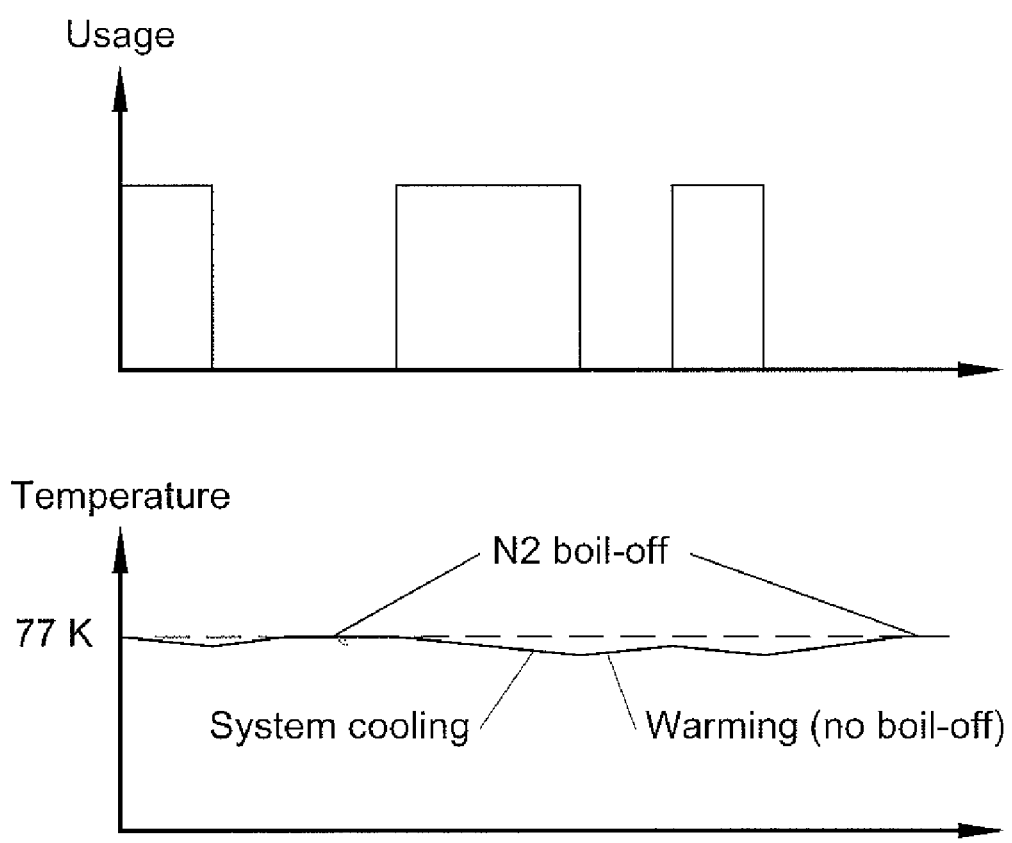
FIG. 2 is a schematic diagram of a hypothetical hydrogen usage pattern and the temperature response for a storage vessel.

FIG. 2 shows a schematic of a hypothetical usage pattern for a storage vessel. Here it is assumed that during periods of usage the refrigeration effect of desorption is greater than the ambient heat load. During periods of usage, the overall system temperature will drop slightly which will prevent any boil-off (venting to atmosphere) of the liquid nitrogen in the volatile liquid container. A subsequent period of non-usage will not immediately cause the liquid nitrogen to vent to atmosphere until the system temperature rises above 77 K (boiling point of liquid nitrogen at atmospheric pressure). The check valve shown in FIG. 1 facilitates this behavior, which could also be accomplished using a pressure relief valve or similar arrangement if a pressure above atmospheric were to be maintained in the volatile liquid container. The only time there is boil-off to atmosphere is during periods of non-usage where the pressure in the volatile liquid container is greater than atmospheric.

The amount of liquid nitrogen required will depend on the exact system size, adsorbent material, and pattern of usage. For the 160 liter dewar example, only about 5 liters of liquid nitrogen would be necessary to compensate for 2 days of continuous non-usage.

The storage vessel may employ secondary refrigeration circuits, such as liquid nitrogen pipes, which may be used, for example, during filling to refrigerate the system. Further, the volatile liquid container may be multiple containers, piping, or any other means that combine heat exchange between the adsorbent, the hydrogen gas and the liquid nitrogen in the volatile liquid container. Multiple volatile liquid containers, either connected or independent, may be employed.

The present invention has been described in terms of specific examples that can be employed for particular uses. This type of storage arrangement would be advantageous for on-board storage containers (e.g., for hydrogen fueled vehicles), remote storage tanks (e.g., a hydrogen filling station), and bulk transport containers. A variety of methods for combining these type of storage containers into an overall supply chain (production to point of use) is possible, which may employ any number of gas transfer means (e.g., compressors) and refrigeration devices.

The supply of cold hydrogen (nominally 77 K) will generally require external refrigeration at a supply station or other filling means that may use liquid nitrogen in a variety of arrangements (not shown), as well as forms of mechanical refrigeration.

A simple arrangement could be passing warm hydrogen gas through a bath of liquid nitrogen, but an improved arrangement would also use the sensible cooling capacity of the vaporized liquid nitrogen through a counter-current heat exchange arrangement.

Preparation of the cold hydrogen will also take into account the two forms of hydrogen designated as ortho-hydrogen and para-hydrogen. As hydrogen is cooled from ambient temperature, there is a conversion of the normal-hydrogen (75% ortho, 25% para) to a higher fraction of para (about 50% para at 77 K). However, this conversion process is a slow one even though it is thermodynamically favored. This exothermic reaction can be a problem in a storage vessel as some of the ortho-hydrogen slowly converts to para-hydrogen which produces heat. A catalyst can be used to immediately convert the normal-hydrogen to its equilibrium state at lower temperatures while cooling in the gas phase. This would ensure there is no heat generated during storage caused by the ortho-para conversion. Alternatively, the conversion is generally quite slow and catalytic conversion may not be practically necessary.

A variety of methods for providing high pressure hydrogen to the storage vessel are possible, including warm (upstream of the cryogenic refrigeration, and generally more practical) or cold (after or between the cryogenic refrigeration, and generally the most efficient) compressors, as well as using supplied hydrogen gas that is already at or above the required pressure.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A method for storing hydrogen gas comprising providing a storage vessel containing both a physisorption type adsorbent material and a volatile liquid container, wherein said volatile liquid container contains a volatile liquid selected from the group consisting of liquid nitrogen and liquid air and is at a temperature of 30 to 250K and is in intimate heat transfer relationship with the hydrogen gas and the adsorbent material and periodically removing at least a portion of said hydrogen gas to provide refrigeration, wherein said refrigeration is used to condense other gases.

2. The method as claimed in claim 1 wherein said hydrogen gas in said storage vessel is at a pressure in the range of 10 to 500 bar.

3. The method as claimed in claim 1 wherein said hydrogen gas in said storage vessel is at a pressure in the range of 50 to 150 bar.

4. The method as claimed in claim 1 wherein said physisorption type adsorbent is selected from the group consisting of high surface area carbons, KOH or thermally activated carbons, alkali metal intercalated, exfoliated, nanostack or herringbone graphitic carbons, carbon nanoforms selected from the group consisting of nano-tubes, nano-horns, nano-onions, Buckminster Fullerenes and their metal decorated or heterosubstituted analogues; crystalline microporous materials consisting of as zeolites, clays and ALPO-4's and their heteroatom substituted analogues; mesoporous silicas, selected from the group consisting of MCM families and their heteroatom analogues; high surface area metallo-organic or organic framework materials; and mixtures thereof.

5. The method as claimed in claim 4 wherein said physisorption type adsorbent is selected from the group consisting of high surface area carbons, KOH, thermally activated carbons, high surface area metallo-organic framework materials; and mixtures thereof.

6. The method as claimed in claim 1 wherein said volatile liquid container is two or more volatile liquid containers.

7. The method as claimed in claim 1 wherein said storage vessel is selected from the group consisting of on-board storage containers, remote storage tanks, and bulk transport containers.

8. The method as claimed in claim 1 wherein said storage vessel is part of an overall supply chain for the provision of hydrogen to the point of use.

9. An apparatus for the storage of hydrogen gas comprising a storage vessel, a physisorption type adsorbent contained within said storage vessel, a volatile liquid container contained within said storage vessel, at least one means for inputting said hydrogen gas and at least one means for inputting a volatile liquid, wherein said volatile liquid container contains a volatile liquid selected from the group consisting of liquid nitrogen and liquid air and said volatile liquid is at a temperature of 30 to 250K.

10. The apparatus as claimed in claim 9 wherein said volatile liquid container is in intimate heat transfer relationship with said hydrogen gas and said adsorbent material.

11. The apparatus as claimed in claim 9 wherein said storage vessel comprises means for feeding hydrogen to said storage vessel.

12. The apparatus as claimed in claim 9 wherein said storage vessel comprises means for removal of hydrogen from said storage vessel.

13. The apparatus as claimed in claim 9 wherein said storage vessel comprises means for feeding volatile liquid to said volatile liquid container.

14. The apparatus as claimed in claim 9 wherein said storage vessel comprises means for venting vaporized volatile gas from said volatile liquid container.

15. The apparatus as claimed in claim 9 wherein said physisorption type material is selected from the group consisting of high surface area carbons, KOH or thermally activated carbons, alkali metal intercalated, exfoliated, nanostack or herringbone graphitic carbons, carbon nanoforms selected from the group consisting of nano-tubes, nano-horns, nano-onions, Buckminster Fullerenes and their metal decorated or heterosubstituted analogues; crystalline microporous materials consisting of as zeolites, clays and ALPO-4's and their heteroatom substituted analogues; mesoporous silicas, selected from the group consisting of MCM families and their heteroatom analogues; high surface area metallo-organic or organic framework materials; and mixtures thereof.

16. The apparatus as claimed in claim 15 wherein said physisorption type adsorbent is selected from the group consisting of high surface area carbons, KOH, thermally activated carbons, high surface area metallo-organic framework materials; and mixtures thereof.

17. The apparatus as claimed in claim 9 wherein said storage vessel further comprises an outer insulation layer.

18. The apparatus as claimed in claim 17 wherein said insulation is a vacuum jacket.

19. The apparatus as claimed in claim 9 wherein said hydrogen gas is stored at a pressure of 10 to 500 bar.

20. The apparatus as claimed in claim 9 wherein said hydrogen gas is stored at a pressure of 50 to 150 bar.

21. The apparatus as claimed in claim 9 wherein there are two or more storage vessels present.

22. The apparatus as claimed in claim 9 wherein there are two or more volatile liquid containers present in said storage vessel.

23. A method for storing hydrogen gas at elevated pressures and cryogenic temperatures comprising providing a storage vessel that contains both a physisorption type adsorbent material and a volatile liquid container which contains a volatile liquid selected from the group consisting of liquid nitrogen and liquid air and is at a temperature of 30 to 250K and at least periodically removing said hydrogen gas to provide refrigeration, wherein said refrigeration is used to condense other gases and said hydrogen gas is maintained at cryogenic temperatures during storage.

24. The method as claimed in claim 23 wherein said hydrogen gas in said storage vessel is at a pressure in the range of 10 to 500 bar.

25. The method as claimed in claim 23 wherein said hydrogen gas in said storage vessel is at a pressure in the range of 50 to 150 bar.

26. The method as claimed in claim 23 wherein said physisorption type adsorbent material is selected from the group consisting of high surface area carbons, KOH or thermally activated carbons, alkali metal intercalated, exfoliated, nanostack or herringbone graphitic carbons, carbon nanoforms selected from the group consisting of nano-tubes, nano-horns, nano-onions, Buckminster Fullerenes and their metal decorated or heterosubstituted analogues; crystalline microporous materials consisting of zeolites, clays and ALPO-4's and their heteroatom substituted analogues; mesoporous silicas, selected from the group consisting of MCM families and their heteroatom analogues; high surface area metallo-organic or organic framework materials; and mixtures thereof.

27. The method as claimed in claim 26 wherein said physisorption type adsorbent is selected from the group consisting of high surface area carbons, KOH, thermally activated carbons, high surface area metallo-organic framework materials; and mixtures thereof.

28. The method as claimed in claim 23 wherein said volatile liquid container is two or more volatile liquid containers.

29. The method as claimed in claim 23 wherein said storage vessel is selected from the group consisting of on-board storage containers, remote storage tanks, and bulk transport containers.

30. The method as claimed in claim 23 wherein said storage vessel is part of an overall supply chain for the provision of hydrogen to the point of use.

* * * * *